UNITED STATES PATENT OFFICE

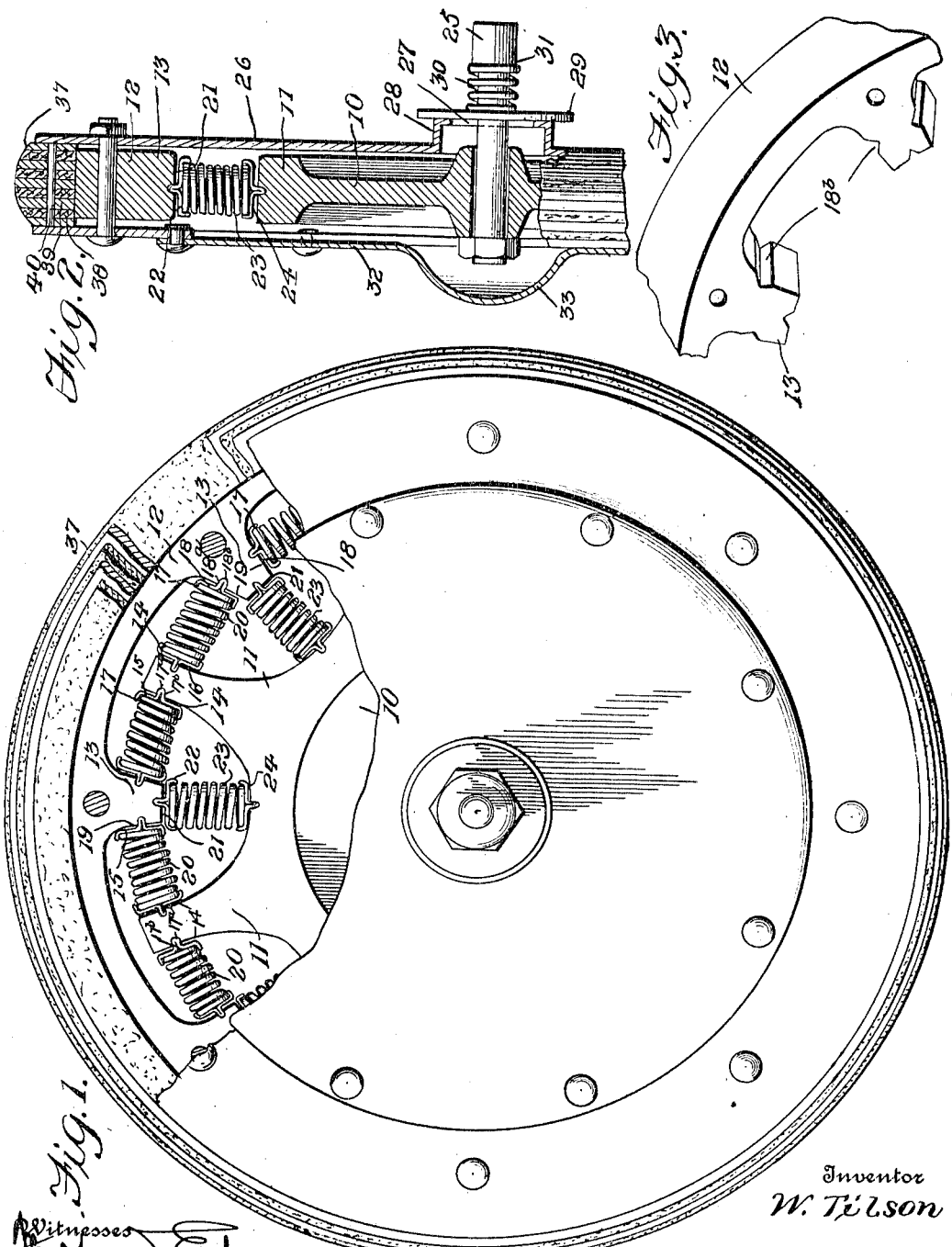

WILLIAM TILSON, OF MOUNT VERNON, ILLINOIS.

SPRING-WHEEL.

1,117,534.  Specification of Letters Patent.  Patented Nov. 17, 1914.

Application filed July 25, 1913. Serial No. 781,225.

*To all whom it may concern:*

Be it known that I, WILLIAM TILSON, a citizen of the United States, residing at Mount Vernon, in the county of Jefferson and State of Illinois, have invented certain new and useful Improvements in Spring-Wheels, of which the following is a specification.

This invention relates to an improvement in resilient wheels.

The primary object of the invention is to provide a vehicle wheel which while it is sufficiently resilient to effectually cushion the axle, will be as substantial as the usual form of metallic-tired non-resilient wheel.

A further object of the invention is to provide a structure in which the cushioning means is completely housed, there being means provided for preventing dust and foreign material from interfering with the operation of the cushioning means.

Another object of the invention is to provide a structure which will effectually cushion the hub of the wheel when the load is applied or when the rim meets with an obstruction, the structure being such that the hub will not rotate to an extent which would distort or displace the springs when the wheel is used on the driving axle of a motor vehicle.

For a full understanding of the invention reference is to be had to the following description and accompanying drawings, in which:—

Figure 1 is a side elevation, a portion of one of the side plates being removed and the tire being shown partly in section. Fig. 2 a transverse section, and Fig. 3 a detail view of the outer ring.

Corresponding and like parts are referred to in the following description and indicated in all the views of the accompanying drawings by the same reference characters.

In the drawings 10 designates the hub which is formed with a plurality of radially extending arms 11, the arms being of a number consistent with the diameter of the hub. A ring 12 embraces the spokes or arms 11 of the hub, said ring being of substantially the same width as the terminals of the arms. The rim is provided with a plurality of inwardly disposed projections 13 which when the ring is assembled on the hub extend between the arms 11, the arms and extensions 13 being thus disposed in staggered relation.

Arranged on the faces 14 of the arms are spring sockets 15 which may be of any suitable construction but which preferably consist of circular plates 16 formed with flanges 17 and with transversely extending ribs $17^a$, preferably struck from the body portion of the plate, said ribs being disposed to engage within the substantially V-shaped transversely extending grooves $17^b$ formed in the faces 14, thus maintaining the plates in proper position. Similar plates 18 are arranged on the faces 19 of the extensions 13, said plates seating by their transversely extending ribs $18^a$, in the grooves $18^b$ formed in the faces of the extensions, the sockets which are arranged on the faces of the ring 12 being disposed to aline with the sockets arranged on the arms 11. Coil springs 20 are disposed between the sockets of the extensions and the sockets of the arms, the terminal convolutions of the said springs being embraced by the flanges 17 of said sockets. While the springs are shown as supported in this manner, attention is called to the fact that they may be secured to the arms and extensions in any suitable manner, the springs having a normal tendency to space the extensions of the ring and the arms of the hub. It will be noted, however, that as the springs are arranged on both sides of each of the extensions and contact with an arm on each side of said extensions that the extensions will be normally maintained at a point intermediate the arms. The terminal 21 of the extensions 13 are each provided with a socket 22 which receives one of the terminal convolutions of a spring 23. A socket 24 is supported in the space between the arms 11 and receives the other terminal convolution of the spring 23. These sockets 22 and 24 are similar in construction to the sockets above described and are each formed with a transversely extending rib adapted to be received in the grooves formed respectively in the hub and in the terminals of the extensions 13. These springs 23 space the ring 12 from the hub and cushion the same when the load is applied.

Particular attention is called to the peculiar manner in which the hub and the outer ring are spaced from each other, the springs which space the same being so disposed as to take up the jar produced by the wheel passing over an obstruction and at the same time effectually cushion the hub when the load is applied. It will be noted that the springs are so disposed that they will not be displaced by a movement of either the rim or the hub whether said movement is a rotary movement or a radial movement.

It will be seen that while the hub is cushioned for rotary movement with respect to the ring that said movement is limited. When the wheel is used on the drive axle of a motor vehicle and the motor started, the hub will not rotate independent of the ring 12, the extensions 13 of the ring preventing said rotation, the hub being permitted to move a sufficient distance to compress the springs 20.

The axle 25 passes through the hub 10. A plate 26 is secured to the ring 12, said plate being formed with a central opening 27, there being a flange 28 surrounding said opening. Arranged on the axle is a plate 29, there being a coil spring 30 interposed between the shoulder 31 formed by reducing the axle and said plate whereby the plate may be maintained in contact with the flange preventing dust and foreign material from passing through the opening 27. A similar plate 32 is arranged on the other face of the ring 12. This plate is formed centrally with a depression 33 whereby the axle is permitted to move freely with respect to the ring. It will be noted by this construction that the axle may move with respect to the ring 12 and that the opening formed in the plate 26 will be effectually closed at all times, the disk which contacts with the flange disposed adjacent said opening being of sufficient diameter to allow for the movement of the axle without uncovering the openings. It will therefore be seen that the space between the plates may be partially filled with oil. A tire 37 is arranged on the ring 12, said tire consisting of a plurality of leather rings 38 between which are arranged steel rings 39. The rings 38 and 39 are clamped between the plates 26 and 32. These rings are held in place by bolts 40 which pass through the same.

The many advantages of a construction of this character will be clearly apparent, as it will be noted that the same provides a wheel which while sufficiently resilient to cushion the load will be as substantial as the usual form of metallic-tired non-resilient wheel. It will also be seen that the entire structure is such as may be easily and economically manufactured and that the various parts may be readily assembled.

What I claim is:—

In a resilient wheel, a hub, a ring encircling the hub, said hub and ring having grooves formed therein, spring sockets carried by the ring and the hub, each of said sockets including a plate having a transversely extending rib struck therefrom, said ribs seating in the grooves formed in the hub and the ring, and springs arranged between the hub and the ring and terminally engaged by said sockets.

In testimony whereof I affix my signature in presence of two witnesses.

WILLIAM TILSON. [L. S.]

Witnesses:
W. N. GRANT,
MINNIE HOIT GRANT.